2,995,251
LIQUID FERTILIZER ATTACHMENT

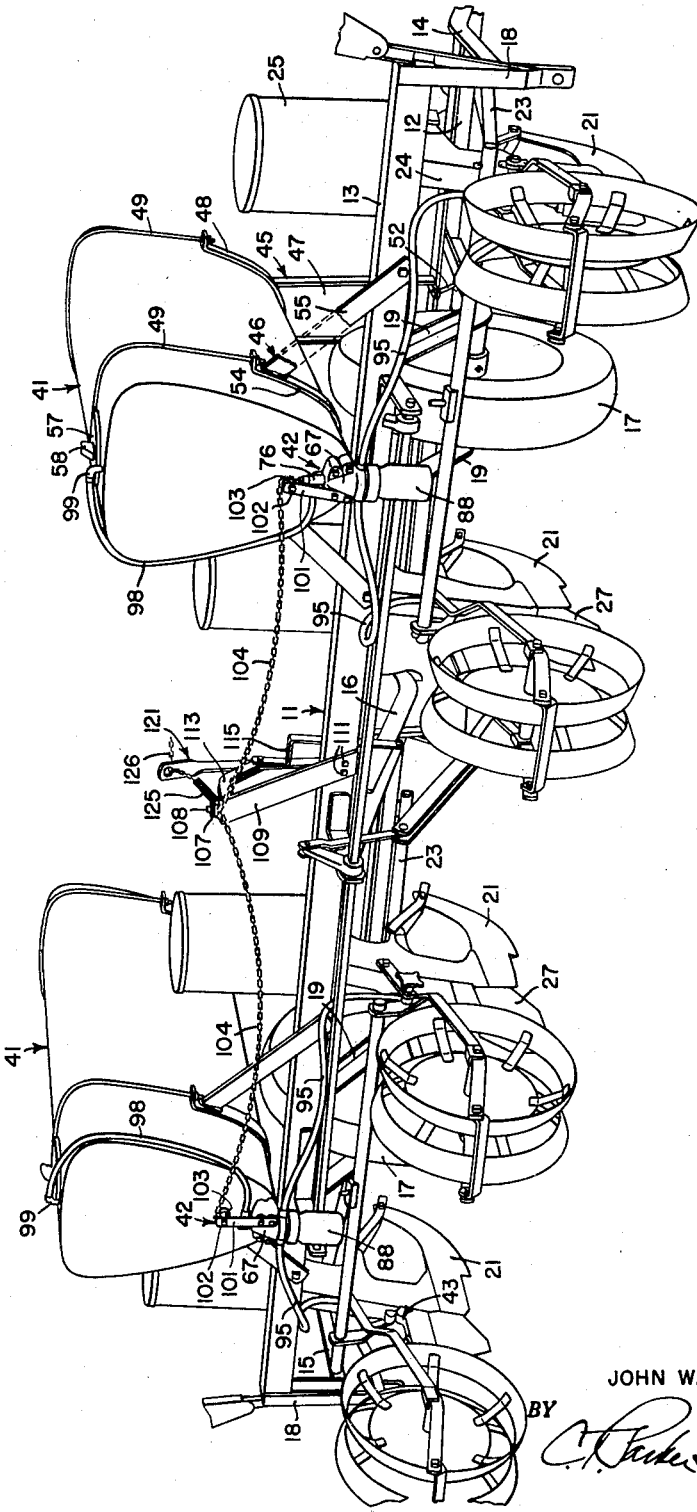

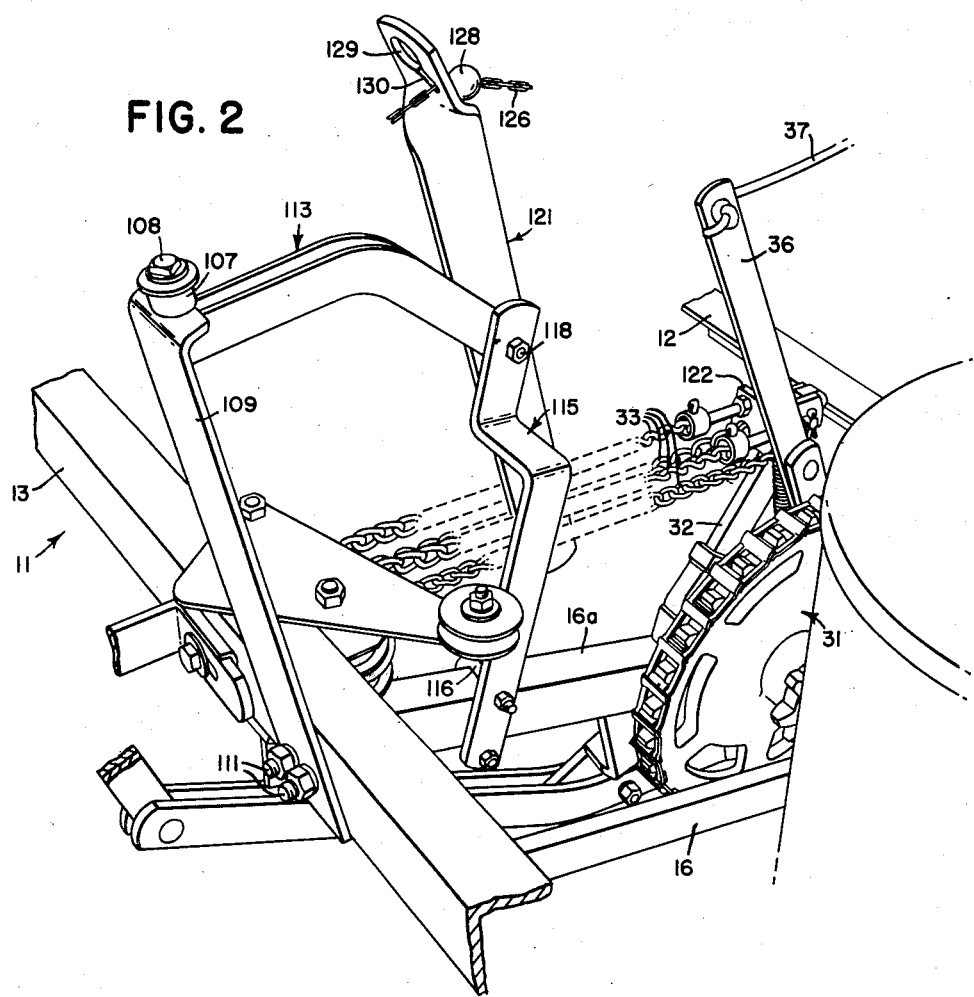

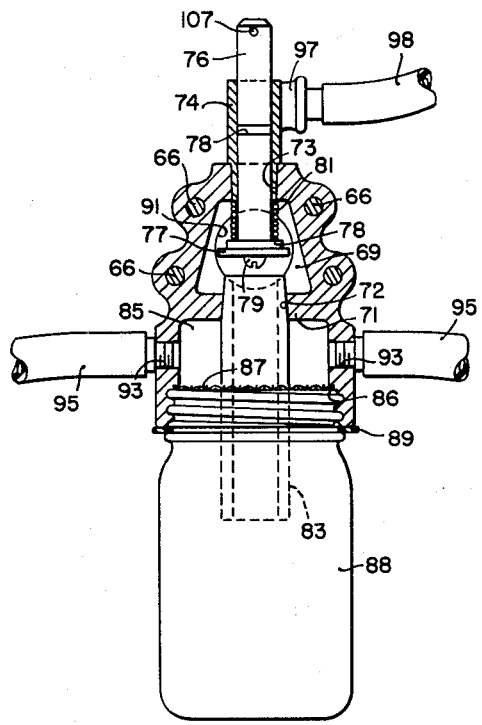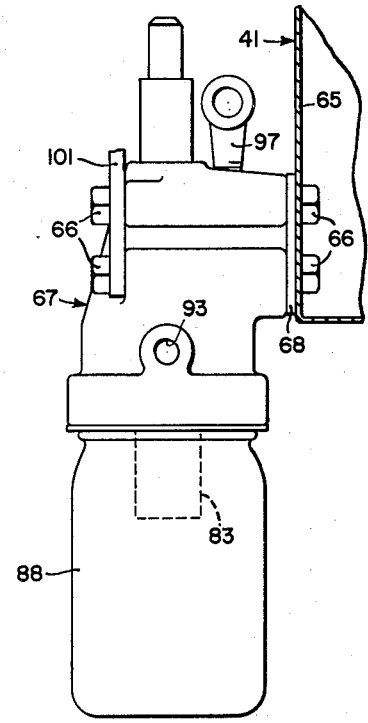

John W. Ackley, Moline, Ill., assignor, by mesne assignments, to Deere & Company, a corporation of Delaware
Original application July 6, 1956, Ser. No. 596,332. Divided and this application Oct. 22, 1957, Ser. No. 691,579

1 Claim. (Cl. 210—172)

This application is a division of my copending application Ser. No. 596,332, filed July 6, 1956 for Liquid Fertilizer Attachment.

The present invention relates generally to agricultural implements and more particularly to planting and fertilizing implements.

The object and general nature of the present invention is the provision of a planting and fertilizing implement particularly constructed and arranged to plant a plurality of rows and distribute liquid fertilizer in or along the rows at the same time that the planting is done.

More specifically, it is a feature of this invention to provide new and improved liquid distribution means and control means therefor, with new and improved valve means and screening means associated therewith.

Still further, an additional feature of this invention is the provision of a planter and liquid distributing implement in which the control of the liquid distribution is connected with the raising and lowering of the planting furrow openers, with additional means so constructed and arranged that the operator may open or close the liquid distributing valve means independently of the position of the planter furrow openers.

These and other objects and advantages of the present invention will be apparent to those skilled in the art after a consideration of the following detailed description of the preferred structure and embodiment of this invention, taken in conjunction with the accompanying drawings, in which:

FIG. 1 is a perspective view of a planting and liquid distributing implement in which the principles of the present invention have been incorporated.

FIG. 2 is a fragmentary perspective showing at an enlarged scale one portion of the valve operating means.

FIG. 3 is a sectional view taken generally centrally through the distributing valve unit.

FIG. 4 is a side view of the distributing valve unit showing its relation to the tank and also a portion of the valve opening means.

Referring first to FIG. 1, it will be seen that the present invention has been illustrated as incorporated in a four-row planting and liquid distributing implement in which, for purposes of illustration, the liquid distributing means, taken as a whole, is shown as an attachment to a four-row corn planter quite similar to that shown in U.S. Patent 2,376,464, issued May 22, 1945 to C. H. White, to which reference may be made if necessary. Briefly, the planter comprises frame means 11 that is made up of a front lower sill bar 12, extending transversely relative to the direction of travel, and a rear transverse sill bar 13 connected together at their ends by right and left hand crossbars 14 and 15. The sill bars 12 and 13 are also connected together by intermediate bars one of which can be seen at 16. The frame 11 is supported on two ground wheels 17 each being journaled for rotation on axle means carried by a wheel frame, each wheel frame being made up of a pair of laterally spaced apart wheel frame bars 19 between which the associated ground wheel 17 is disposed. The planter also includes a plurality of furrow openers 21 connected with the front sill bar 12 by upper and lower links 23 to the rear ends of which is connected a generally vertically disposed shank 24 that carries at its upper end a seed hopper 25 containing suitable seed selecting mechanism of conventional construction. In the planter shown in FIG. 1, four planting units are shown and each unit includes a rear fertilizer boot 27 having an opening in to which normally a fertilizer tube is connected, usually in the manner indicated in FIG. 8 in U.S. Patent 2,369,508, issued February 13, 1945 to C. H. White. Generally, the connection between the fertilizer tube, usually formed as a ribbon, and the fertilizer boot is in the nature of a bayonet joint, including a pin or a pair of pins on the lower end of the fertilizer tube and an L-shaped slot, or a pair of such slots, formed on the inside of the fertilizer opening receiving the fertilizer tube. A joint of this kind is shown in the patent to Smith 422,987, issued March 11, 1890.

The planter shown in FIG. 1 is also equipped with power lift mechanism substantially like that disclosed in the White Patent 2,376,464. Such mechanism includes a self-interrupting clutch unit 31 driven from the ground wheels and arranged, when actuated, to swing a lift lever 32 in a generally fore-and-aft direction, the part 32 being swung forwardly when it is desired to raise the furrow openers into a transport position and rearwardly when it is desired to lower the furrow openers. To this end, the upper portion of the swingably mounted lever 32 is connected to four chains 33 that extend from the lever 32 rearwardly to the rear sill bar and then laterally outwardly over associated pulleys or sheaves and downwardly to their respective points of connection with the furrow openers. The planter frame 11 is provided with a forwardly extending hitch that is adapted to be connected to the conventional farm tractor, and the clutch unit 31 is controlled by usual clutch lever 36 and a cable connection 37 or the like that leads forwardly to the operator's station on the tractor. The clutch unit 31 is mounted on one of the crossbars 16 of the frame and also on a supporting angle member 16a, which also serves as a crossbar for the frame, that is connected at its front and rear ends to the front and rear frame sill bars 12 and 13.

Liquid dispensing mechanism is associated with the planter and, in general, comprises a pair of liquid fertilizer containing tanks 41 and suitable controlling valve means 42 and adjustable metering units 43. There is a liquid distributing valve unit 42 for each tank 41 and a metering unit 43 for each of the planter furrow opener units 21.

Each of the tanks 41 is supported by a front bracket structure 45, carried by the front sill bar 12 of the planter, and a rear bracket structure 46 carried by the rear sill bar 13. Each tank 41 is supported by the planter frame directly over the associated ground wheel 17 and substantially axially centered, both laterally and in a fore-and-aft direction, over the associated wheel. The front bracket structure 45 comprises a generally vertically disposed channel member 47 having at its upper end a generally U-shaped cradle strap 48, the upper ends of which are turned laterally outwardly and apertured to receive a tank-securing U-bolt 49. As will best be seen from FIG. 1, each tank 41 is generally elongated and of substantially pear-shaped configuration, being relatively narrow in the lower portion and widening upwardly, the depth of the tank being considerably greater than the transverse width at the widest point. The cradle strap 48 is, of course, of corresponding configuration. The lower end of each bracket channel 47 is fixed to the associated planter sill bar 12 by any suitable means.

The rear mounting bracket 46 for the tanks 41 comprises a cradle strap 54, a pair of brace links 55 extending downwardly and laterally outwardly from the upper portion of the cradle strap 54. The upper ends of the latter are turned outwardly and apertured to receive a second tank-securing U-bolt 49 for the rear portion of the associated tank 41.

Access to the interior of each tank is provided by means of a closure cover 57 in the form of a round disk and associated clamping means 58 that secures the disk to the tank in sealed relation. As will best be seen from FIG. 1, the front brackets 45 are longer than the rear brackets 46 so as to accommodate the higher position of the rear sill bar 13. The front brackets 45 are of substantial width and serve to prevent any lateral displacement of the front ends of the associated tank. Lateral displacement of the rear end of the tank is prevented by the downwardly and outwardly diverging cradle legs 55. The rear end of each tank is adapted to receive an associated distributing valve structure 42 as mentioned briefly above, and these valve structures will now be described.

Referring now to FIGS. 1 and 4, each tank 41 is arranged so that its rear end extends rearwardly of the associated rear sill bar 13 a substantial distance. The rear end plate of the tank, indicated at 65 in FIG. 4, is provided with four apertures to receive bolt means 66 (FIG. 3) by which a distributor valve body, preferably in the form of a casting 67, is fixed to the associated tank 41 with an intervening resilient gasket 68 sealing the connection between the valve body and the tank. The valve body is provided at its upper portion with a chamber 69 disposed above a generally central partition 71, which is provided with a through opening 72, and the upper portion of the valve body is provided with an upper opening 73. Disposed in the upper opening 73 is a valve stem guide 74, preferably in the form of a short tube of plastic or other corrosion resistant material, the lower end of which is threaded into the upper opening 73. A valve stem 76 is disposed for generally vertical movement therein, extending at its upper end from the upper end of the pipe or guide 74. Centrally the valve 76 is provided with a groove 78 in which an O-ring or other sealing means is disposed. The lower end of the valve stem extends into the chamber 69 and carries a valve closure 77 connected to the lower flanged end 78 of the valve stem 76 by means of a screw 79 or the like. A spring 81 is disposed between the flanged lower end 78 of the valve stem and the upper wall of the chamber 69 whereby the valve is biased for movement toward its closed position. The lower partition wall 71 carries an inlet tube 83, the upper end of which is tapered and threaded into the opening 72, and the upper end of the inner tube is disposed above the partition wall 71 and serves as a valve seat to receive the closure 77. The lower portion of the inlet tube 83 extends downwardly and outwardly of the distributor valve body casting 67 and through a discharge chamber 85 that is formed therein above the lower portion of the member 67. The latter is formed with a downwardly facing shoulder 86 against which a screen 87 of stainless steel is disposed, the screen 87 having an opening through which the lower portion of the inlet tube 83 extends. Below the shoulder 86 the casting 67 is provided with screw threads shaped to receive the upper portion of a commercially available Mason jar 88 that surrounds the lower end of the inlet tube 83. The jar when tightened against a sealing ring 89 serves to hold the screen 87 in position.

Liquid enters the upper chamber 81 through an opening 91 which registers with a similar opening in the rear tank end 65 and, if the valve 77 is open, as shown in FIG. 3, the liquid passes downwardly through the inlet tube into the jar 88, upwardly through the screen 87, and then outwardly through a pair of openings 93 in the lower portion of the distributor valve body 67, the openings 93 receiving nipples or the like to which delivery tubes 95 are connected. Preferably, the delivery tubes 95 are of transparent plastic material of any suitable composition and permit the operator to ascertain visually whether or not liquid is flowing through the tubes 95.

In order to afford the operator an opportunity to check the liquid level in the tank, the upper portion of the valve body 67 is provided with a threaded opening into which a nipple 97 is received. A transparent tube 98, also preferably of plastic or the like, is connected at its lower end to the nipple 97 and extends around the side of the tank and upwardly to a nipple 99 by which the upper portion of the tube 98 is connected into the space in the upper portion of the tank 41.

Means to open and close valve 77 includes a bracket 101 that is carried by the casing 67, being fixed to the latter by two of the bolts 66, as best shown in FIGS. 1, 3 and 4. The upper end of the bracket 101 is apertured to receive a bolt 102 (FIG. 1) on which a roller 103 is mounted. A chain 104 is trained over the roller 103 and extends downwardly to the valve stem 76, being connected to the latter by a pin 107 or other suitable fastening means. Thus, a pull on the chain 104 serves to lift the valve 77 against the bias of the spring 81 and thus open communication between the tank and the auxiliary tubes 95 through the associated sediment chamber 88 and screen 87. When tension on the cable 104 is released, the spring 81 closes the valve and shuts off the delivery of liquid through the associated delivery tubes 95. Each delivery tube discharges into or through the metering unit 43 on the associated furrow opener unit.

The chains 104 from the two tanks 41 extend laterally inwardly from the associated rollers 103 and are disposed around a guide 107, which may be a roller like the roller 103, mounted by means of a bolt 108 on the upper end of a center post 109, preferably in the form of a plate member secured to the rear sill angle 13 by a pair of bolts 111 at its lower end, the upper end being bent forwardly into a horizontal plane and apertured to receive the bolt 108. The latter also secures the rear or bight portion of a valve control arm guide member 113 to the post or bracket 109. The front end of the control arm guide member 113 is connected to and supported on the upper end of a support bar 115, the lower end of which is connected by U-bolt 116 rigidly to the frame angle 16a. The upper end of the supporting bar 115 is offset laterally so as to bring the upper end in the plane of the guide member 113 and is apertured to receive a bolt 118 which secures the bars 113 and 115 together and also serves as means on which a valve control arm 121 is mounted for rocking movement. The lower end of the arm 121 is disposed between the laterally spaced apart pairs of chains 33 in a position to be engaged by a connecting member 122 by which the chains 33 are connected with the upper end of the power lift actuated lever 32. The parts are arranged so that when the furrow openers are lowered by the rear swinging of the upper end of the lever 32, the connector 122 engages the lower end of the valve control arm 121 and swings the upper end of the latter forwardly. This movement of the arm 21 actuates the chains 104 by virtue of their forward connection through a spring 125 with a manually controlled tension member, such as a chain or cable 126, that extends forwardly to the operator's station on the tractor. The element 126 is connected with the control arm 121 through an abutment 128 on the chain and which is adapted to be disposed in a keyhole opening 129 at the upper end of the control arm 121, the chain 126 lying in the slot 130 of the opening 129 with the abutment 128 forward of the control arm. When the valve control arm 121 is swung rearwardly, as in the position shown in FIG. 2, tension on the chains 104 is relaxed and the valves in the distributing units 42 are closed. At any time the operator desires to do so, he may pull forwardly on the cable 126, and thus open the valves 77 manually. On the other hand, if he should desire the valves to remain closed even though the furrow openers are lowered, the operator may pull slightly on the chain or cable 126 (FIG. 1), sufficient to move the abutment 128 forwardly, and then by lifting up slightly on the cable 126, the abutment may be brought in front of the large portion of the opening 129, whereupon relaxing the tension in the cable 126 then permits the spring 125 to draw the abutment 128 entirely through the opening in the upper end of the control arm 121. When this occurs forward movement of the lever 121 does not exert any pull through the rear portion of the element 126 against the valve-opening cables or chains 104.

The operation of the present invention is believed to be obvious from the above description. The distributor valves are opened and closed in accordance with the lowering and raising, respectively, of the planter furrow openers in almost all normal operation. That is to say, when the runners or furrow openers are lowered to form furrows, the distributing valve mechanism is operated to automatically distribute liquid fertilizer into the furrows. If, however, it should be desired to raise and lower the furrow openers without operating the distributing valve means, the operator may disengage the abutment 128 from in front of the control arm 121 and bring it to the rear side thereof, as described above, whereby movement of the arm 121 will not open the distributor valve.

While I have shown and described above the preferred structure in which the principles of the present invention have been incorporated, it is to be understood that my invention is not to be limited to the particular details, shown and described above, but that, in fact, widely different means may be employed in the practice of the broad aspects of my invention.

What I claim, therefore, and desire to secure by Letters Patent is:

In a liquid distributing implement including a mobile frame, a tank carried thereby, and operating means adapted to be shifted from one position to another, the combination therewith of valve mechanism adapted to be connected to be operated concurrently with and in response to the movement of said operating means when moved between one of said positions toward the other, said valve means comprising a valve body having an upper chamber communicating with the interior of said tank, a lower chamber, a partition between said chambers and having an opening therethrough, a valve closure for controlling the flow from the upper chamber to the lower chamber and including a stem extending upwardly out of the upper portion of said upper chamber, an inlet tube fixed in said partition opening with an end extending above said partition and serving as a valve seat for said valve closure, spring means disposed in said upper chamber and acting against the upper portion of said upper chamber to urge said valve closure downwardly to close against the upper end of said inlet tube, a delivery tube communicating with the interior of said lower chamber, and means including filter means in said lower chamber to intercept and trap sediment and the like brought into the lower chamber with the liquid flowing into the latter so as to prevent said sediment and the like from flowing out through said delivery tube, and means connecting the upper end of said valve stem with operating means whereby movement of the latter in one direction opens said valve and movement in the other direction provides for closure of said valve by said spring means, the latter being in the upper chamber and thereby retained out of contact with any sediment or the like accumulated in the lower chamber.

References Cited in the file of this patent

UNITED STATES PATENTS

| | | |
|---|---|---|
| 388,550 | Gallaway | Aug. 28, 1888 |
| 1,062,236 | Hitchcock | May 20, 1913 |
| 1,124,587 | Bullington | Jan. 12, 1915 |
| 2,503,566 | Scott | Apr. 11, 1950 |
| 2,726,770 | Sette | Dec. 13, 1955 |

FOREIGN PATENTS

| | | |
|---|---|---|
| 4,417 | Great Britain | 1906 |
| 305,675 | Italy | Feb. 14, 1933 |
| 999,955 | France | Oct. 10, 1951 |